S. A. Smith,
Shaft Coupling.
No. 111,152.  Patented Jan. 24, 1871.
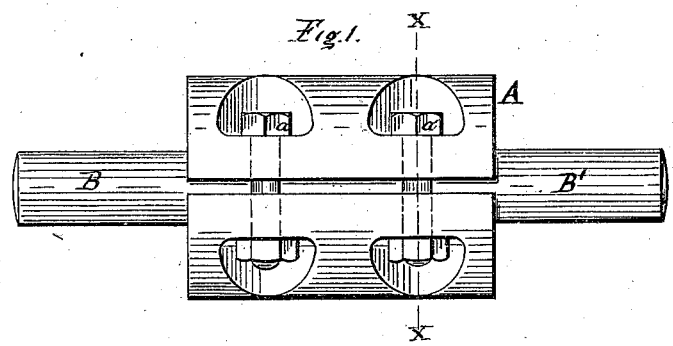
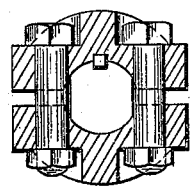
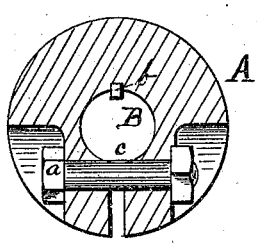
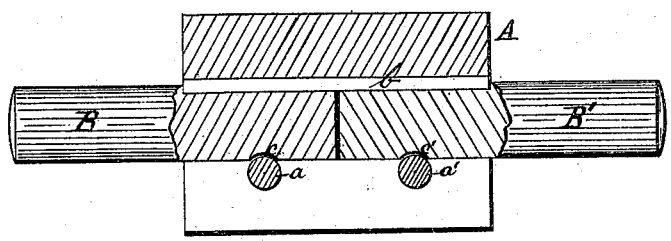
Witnesses:
E. Oscar Haeuptner
H. P. Heyl
Scott A. Smith.

UNITED STATES PATENT OFFICE.

SCOTT A. SMITH, OF PHILADELPHIA, PENNSYLVANIA, ASSIGNOR TO CRESSON & SMITH, OF SAME PLACE.

IMPROVEMENT IN COUPLINGS FOR SHAFTING.

Specification forming part of Letters Patent No. 111,152, dated January 24, 1871.

I, SCOTT A. SMITH, of the city and county of Philadelphia, State of Pennsylvania, have invented a new and useful Improvement in Couplings for Shafting, of which the following is a specification:

My invention relates to an improvement in the construction of that class of couplings which is arranged to clamp and embrace the ends of two adjacent shafts by pressure from bolts or screws. In this form of coupling, in case the bolts are not properly tightened from whatever cause, or in case they are made loose by continued working, the coupling will move along on the shafts, or one of the shafts may work out of the coupling, thus in either case permitting a shaft to fall from place.

The object of my invention is to make the bolts perform both the provisional duty of preventing the coupling from moving from its place, and also to retain the shafts in position until such time as the imperfect tightening of the bolts shall be discovered by the coupling not running true, or by an unusual noise, caused by the yielding of the coupling.

In the accompanying drawing, in Figs. 1, 2, and 3, my improvement is shown as applied to a form of clamp-coupling separated on one side only, which coupling is the subject of another patent. In Fig. 4 it is shown as applied to a coupling made in two parts.

Figure 1 shows the ends of two shafts held in a clamp-coupling. Fig. 2 is a transverse section on the line X X. Fig. 3 is a longitudinal section of the coupling A. Fig. 4 is a transverse section of a form of clamp-coupling to which it is evident my invention may be applied.

In Figs. 1, 2, and 3, A is the coupling. B and B' are the shafts. $a$ and $a'$ are the bolts. $b$ is the ordinary key.

Each shaft has a transverse groove cut in its cylindrical surface, as shown at $c$ and $c'$ in Figs. 2 and 3, into which the bolts are very loosely fitted, thus rendering it impossible for a shaft or a coupling to move wholly out of place, to cause an accident by the falling of a shaft.

It is to be understood that in the ordinary and correct working of the coupling the whole and sole duty of the bolts is to put a pressure upon the shafts sufficient to prevent any longitudinal movement, as in practice it is found that any continued movement, however slight, destroys the bore of the coupling.

I wish it to be distinctly understood that I do not claim broadly and separately any of the parts illustrated and described, as clamp-couplings are old and well known, or are the subject of other patents.

I therefore limit my claim to and desire Letters Patent for—

The combination of a clamp-coupling, A, constructed substantially as described, with the bolts $a$ and $a'$, and the transverse grooves $c$ and $c'$, in the shafts B and B'.

SCOTT A. SMITH.

Witnesses:
E. OSCAR HAEUPTNER,
H. B. HEYL.